July 28, 1959 A. J. GARSCIA ET AL 2,897,444
ELECTRICAL MEASURING MEANS FOR MEASURING WELDING CURRENT FLOW
Filed Sept. 6, 1955 3 Sheets-Sheet 1
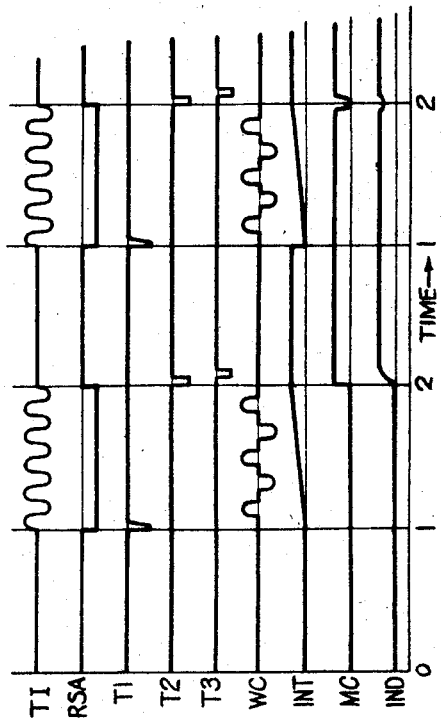
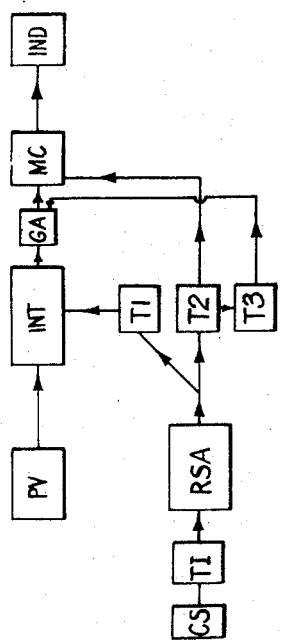

United States Patent Office 2,897,444
Patented July 28, 1959

2,897,444

ELECTRICAL MEASURING MEANS FOR MEASURING WELDING CURRENT FLOW

Alfons John Garscia and Robert Findlay Rodger, Derby, England, assignors to Rolls-Royce Limited, Derby, England, a British company Application September 6, 1955, Serial No. 532,657

Claims priority, application Great Britain September 16, 1954

7 Claims. (Cl. 324—103)

This invention relates to electrical measuring means and is more particularly concerned with means for measuring the welding current flowing in the electrode circuit of intermittently-operated alternating-current welding apparatus.

We have found that in order to test the quality of welds produced in such welding apparatus, it is desirable to be able to measure accurately the secondary welding current and this invention has for an object to provide electrical measuring apparatus for this purpose.

According to the present invention, electrical measuring apparatus for measuring the welding current in intermittently-operated alternating-current welding apparatus comprises input means including electro-magnetically-operated pick-up means and adapted to produce a pulsating output which is determined by the instantaneous current flow in the welding circuit which includes the welding electrodes, integrator means connected to the pick-up means to have said pulsating output fed thereto and adapted to produce an output which is determined by the total welding current flow in a welding cycle and by a selected time factor, a memory circuit connected to be energised by the output of the integrator means and including an indicator device to give a reading determined by said output of the integrator means, and triggering means adapted to produce a first triggering signal to set the integrator means at the commencement of welding current flow in a welding cycle, to produce a second triggering signal to discharge the memory circuit on cessation of welding current flow in said welding cycle, and to produce a third triggering signal immediately following the discharge of the memory circuit to permit re-energisation of the memory circuit by the output of the integrator means due to the flow of welding current which has just ceased.

Conveniently the indicator device which is connected to the memory circuit, comprises a D.C. voltmeter and the period of time which elapses between the second and third triggering signals is selected to be small compared with the time required for the voltmeter to respond to the discharge of the memory circuit, whereby whilst the welding current in successive welding cycles maintains a selected value the indication given in the voltmeter will remain substantially constant.

The welding cycle in intermittently-operated alternating-current welding apparatus is usually controlled by electronic timing mechanisms and in the event that a timing fault develops poor welds may be obtained.

According to a preferred feature of this invention, in order to obtain an immediate signal of the incidence of a timing fault, the integrator means is arranged to give an output which is determined by the total welding current in a welding cycle divided by a selected factor which represents the desired number of current cycles in the welding period. For instance if desired, the integrator means may be provided with means selectively to vary the time constant of the integrator means.

According to another preferred feature of this invention, the triggering means is connected to be supplied with power from the main supply through the welding apparatus thereby to be supplied with power only during the passage of welding current.

According to another feature of this invention, the pick-up means of the input means may be in the form of a split toroid which in use may readily be made to encircle one of the arms which carries an electrode of the welding apparatus, and the halves of the split toroid may be connected to separate integrators to produce from inputs which are proportional to the rate of change of flux around the welder arm, to outputs proportional to the flux, these outputs being fed to the integrator means through biphase rectifiers.

One embodiment of measuring apparatus according to this invention will now be described with reference to the accompanying drawings, in which—

Figure 1 illustrates diagrammatically the parts of the measuring apparatus,

Figure 2 is a current flow diagram for various parts of the apparatus,

Referring first to Figure 1 of the drawings, the measuring apparatus comprises an electro-magnetically-operated pick-up PV for producing a pulsating voltage, which pick-up includes for instance a split toroid coil, an integrator INT which is fed with the pick-up output voltage, a memory circuit MC fed through a gated amplifier GA with the output of the integrator, and an indicator device IND connected to be operated by the memory circuit.

The measuring apparatus also comprises triggering input means TI which feeds to a rectifier, shaper and amplifier circuit RSA from which the output is fed to two trigger multivibrators $T_1$, $T_2$. The triggering input means also includes a third multivibrator $T_3$ connected to be actuated by a pulse from the multivibrator $T_2$. The trigger multivibrator $T_1$ is connected to the amplifier circuit RSA to be actuated by the beginning of the trigger waveform and to the integrator INT to feed a signal to it. The trigger multivibrator $T_2$ is to be actuated by the end of the trigger waveform and is also arranged to feed a signal to the memory circuit thereby to discharge it at the end of the flow of the triggering input. The trigger multivibrator $T_3$ is arranged to be actuated by the trailing edge of the pulse from the multivibrator $T_2$ thereby to feed a signal to the gated amplifier GA shortly after cessation of the triggering input thereby to permit the memory circuit to be recharged by the integrator INT.

A diagrammatic representation of the operation of the measuring apparatus is given in Figure 2 and in this figure the time base is divided into two welding cycles each having a duration of two periods, for the first of which periods the welding current is not flowing and for the second of which periods the current is flowing, as indicated by the traces TI and WC. The output of the apparatus RSA is indicated by the correspondingly referenced trace and the impulses produced by the trigger multivibrators are indicated by the numbers $T_1$, $T_2$, and $T_3$. The integrator output is referenced INT and the memory circuit condition is indicated by the trace MC, and it will be seen that for the first welding cycle the memory circuit is unenergised and thereafter the memory circuit is de-energised for only a short period. The indication obtained is shown by the trace IND and it will be seen that it corresponds substantially to the memory current condition except that on discharge of the memory current the indication does not fall to zero. This is due to the inertia of the indicating instrument.

Figure 3:
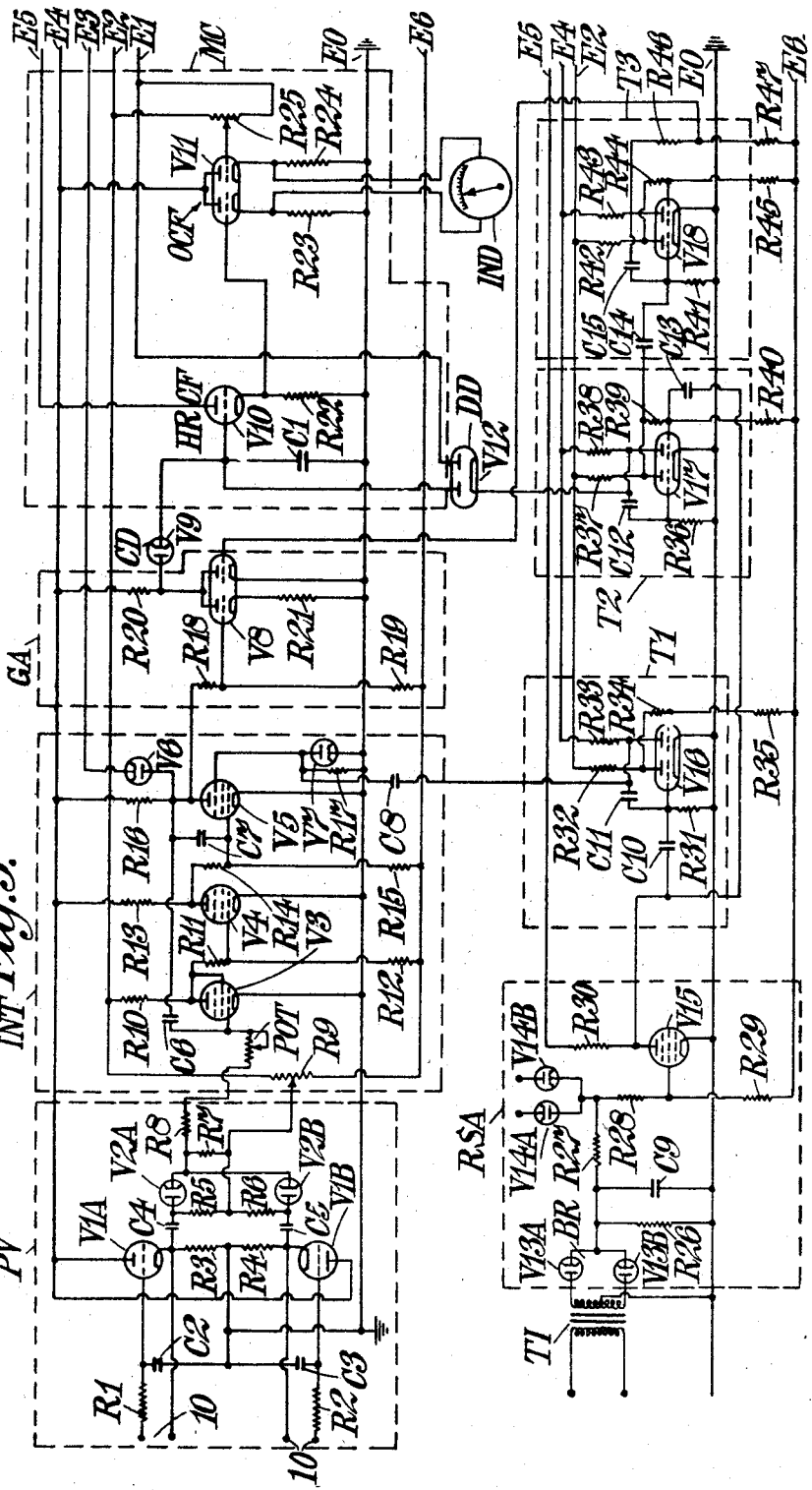
Figure 3 shows a wiring diagram for the apparatus.

Turning now to Figure 3, the circuit diagrams for the various parts of the measuring apparatus are enclosed in dashed boxes which are referenced to correspond with the references of Figure 1. In Figure 3 the split toroid which encircles the welder arm, is not shown but the terminals to which the parts of the toroid are connected are indicated at 10.

The inputs from the halves of the split toroid, as will be seen, are fed to separate integrator circuits which convert the input from one proportional to the rate of change of flux around the welder arm to an output which is proportional to the flux itself (and thus to the welding current) and the outputs are fed to biphase rectifiers to give a uni-directional pulsating output.

The integrator is shown as a Miller integrator and the time factor of the integrator is varied by means of a potentiometer POT. The Miller integrator is arranged to charge the memory circuit which includes a memory capacitor $C_1$ through a gated amplifier GA and a charging diode CD. The memory circuit comprises in addition to the memory capacitor $C_1$ a high resistance cathode follower HRCF and a double triode output cathode follower OCF and the indicator IND is a D.C. voltmeter connected between the cathodes of the cathode followers.

The triggering input TI of the triggering means is indicated as a transformer which will be connected to be supplied with power from the welding apparatus control system CS and the part RSA comprises a biphase rectifier BR, a smoother circuit, a limiter and shaper, and a shaper and amplifier.

The three trigger multivibrators $T_1$, $T_2$, $T_3$ are connected as above set forth and as stated above the pulse is fed from the trigger multivibrator $T_1$ to the integrator INT to start it.

The output voltage of the integrator INT is fed to the grid of the gated amplifier GA and the anode of the gated amplifier GA is normally held at a low value of voltage. The pulse emitted by the trigger multivibrator $T_2$ is arranged to de-energise the memory capacitor through a discharge diode DD and immediately thereafter the impulse from the trigger multivibrator $T_3$ is fed to the gated amplifier GA so permitting the memory capacitor $C_1$ to be charged through the charging diode CD. The impulse from the trigger multivibrator $T_3$ allows the anode of the gated amplifier GA to assume a value proportional to its input and thus to the mean secondary welding current during the last completed welding cycle.

The memory capacitor is thus charged to the voltage of the anode of the gated amplifier and when the charging pulse from the multivibrator $T_3$ is over the memory capacitor cannot discharge through the charging diode CD.

The high resistance cathode follower is arranged not appreciably to discharge the memory capacitor $C_1$ in the time of any welding period. The impedance of the output of the high resistance cathode follower is relatively low and it feeds one grid of the pair of triodes forming the output cathode followers and the other grid is maintained by a constant stable potential.

The following is a table giving the values of the capacitors and resistances and the types of valves employed in one measuring apparatus in accordance with the foregoing description:

*Resistances*

| | | | |
|---|---|---|---|
| $R_1$ =500K | $R_{13}$= 50K | $R_{25}$=100K pot. | $R_{37}$= 56K |
| $R_2$ =500K | $R_{14}$=150K | $R_{26}$=100K | $R_{38}$= 30K |
| $R_3$ = 10K | $R_{15}$=500K | $R_{27}$=100K | $R_{39}$=220K |
| $R_4$ = 10K | $R_{16}$= 15K | $R_{28}$=560K | $R_{40}$=220K |
| $R_5$ = 82K | $R_{17}$= 1M | $R_{29}$=500K | $R_{41}$=100K |
| $R_6$ = 82K | $R_{18}$=250K | $R_{30}$=100K | $R_{42}$= 56K |
| $R_7$ =250K | $R_{19}$=220K | $R_{31}$=100K | $R_{43}$= 30K |
| $R_8$ = 1M | $R_{20}$= 30K | $R_{32}$= 56K | $R_{44}$=220K |
| $R_9$ =100K | $R_{21}$= 4K | $R_{33}$= 30K | $R_{45}$=220K |
| $R_{10}$=200K | $R_{22}$= 1M | $R_{34}$=220K | $R_{46}$=250K |
| $R_{11}$=150K | $R_{23}$= 50K | $R_{35}$=220K | $R_{47}$=100K |
| $R_{12}$=680K | $R_{24}$= 50K | $R_{36}$=100K | |

*Capacitances*

| | | | |
|---|---|---|---|
| $C_1$=0.005 μf. | $C_5$= 1 μf. | $C_9$= .1 μf. | $C_{13}$= 200 pf. |
| $C_2$= .02 μf. | $C_6$=.001 μf. | $C_{10}$= 100 pf. | $C_{14}$= 100 pf. |
| $C_3$= .02 μf. | $C_7$= 500 pf. | $C_{11}$=.001 μf. | $C_{15}$=.001 μf. |
| $C_4$= 1 μf. | $C_8$=.25 μf. | $C_{12}$=.001 μf. | |

*Valves*

| | | | |
|---|---|---|---|
| $V_1$=ECC40 | $V_6$ =EA76 | $V_{11}$=ECC40 | $V_{16}$=ECC91 |
| $V_2$=EB91 | $V_7$ =EA76 | $V_{12}$=EB91 | $V_{17}$=ECC91 |
| $V_3$=EL32 | $V_8$ =ECC40 | $V_{13}$=EB91 | $V_{18}$=ECC91 |
| $V_4$=EF91 | $V_9$ =EB91 | $V_{14}$=EB91 | |
| $V_5$=EF91 | $V_{10}$=6C4 | $V_{15}$=EF91 | |

*Voltages*

| | |
|---|---|
| $E_0$= 0 v. | $E_4$=+280 v. Stabilised |
| $E_1$= +70 v. Stabilised | $E_5$=+400 v. Unstabilised. |
| $E_2$=+150 v. Stabilised | $E_6$= −90 v. Stabilised |
| $E_3$=+225 v. Stabilised | |

Figure 4:
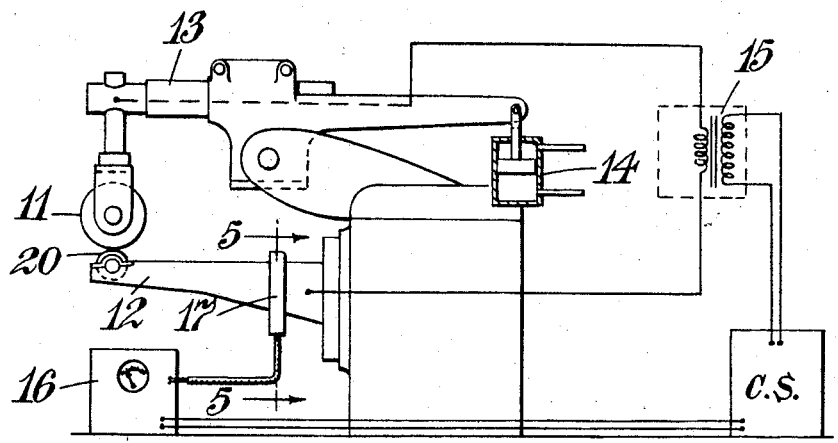
Figure 4 illustrates diagrammatically the measuring apparatus in use in association with welding apparatus.

Referring now to Figure 4, there is illustrated the use of the measuring apparatus with welding apparatus. The welding apparatus comprises a pair of wheel type electrodes 20, 11 the electrode 20 being carried on a fixed arm 12 and the electrode 11 being carried on a rocking arm 13. Rocking of the arm is effected by ram 14 which is used to apply the appropriate welding pressure and to release the pressure in known manner for intermittent operation of the apparatus. The alternating current supply is effected through a circuit including the electrodes 20, 11, arms 12, 13 and the secondary of a transformer 15.

The measuring apparatus is indicated at 16 and the split toroid of the pick-up PV is indicated at 17.

Figure 5:
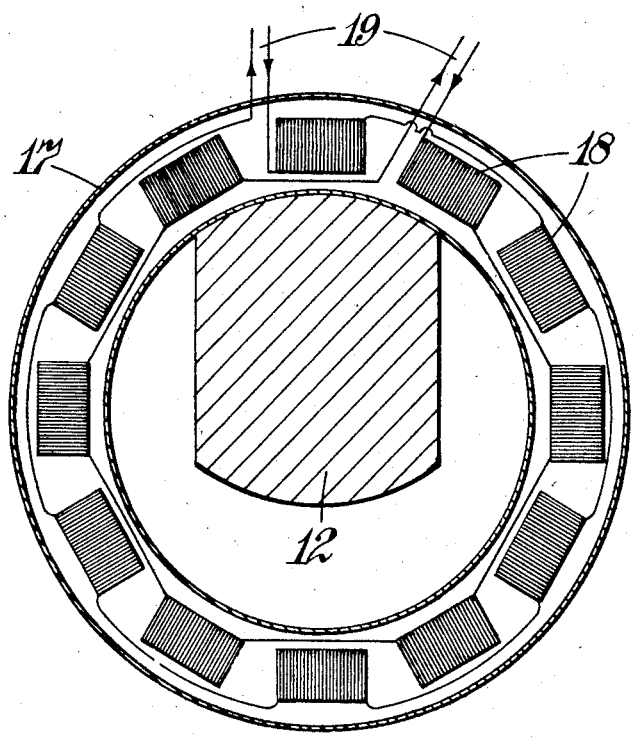
Figure 5 is a section on the line 5—5 of Figure 4.

As indicated in Figure 5, the split toroid comprises an even number of coils 18 disposed in a circle with their axes tangential to a circle with its centre on the axis of the toroid and with a radius equal to the mean radius of the toroid.

The coils 18 are connected in two circuits, alternate coils being in series in one circuit and the remaining coils being in series in the second circuit. The arrangement is the equivalent to two full toroidal coils.

The circuits are connected by leads 19 to the terminals 10 of Figure 3.

What we claim is:

1. Electrical measuring apparatus for measuring the welding current in intermittently-operated alternating-current welding apparatus which includes a pair of welding electrodes and which is arranged to give successive current flows each of equal time duration, comprising input means including electro-magnetically-operated pick-up means and adapted to produce a pulsating output which is determined by the instantaneous current flow in the welding circuit which includes the welding electrodes, integrator means connected to the pick-up means to have said pulsating output fed thereto for each said time duration and adapted to produce at the end of each of said time durations an output which is determined by the total welding current flow in a welding cycle and by a selected time factor, a memory circuit including a condenser connected to be charged by the output of the integrator means and also including an indicator device giving a reading determined by the charge on said condenser, and triggering means producing a first triggering signal actuating means to start the integrator means at the commencement of welding current flow in a welding cycle, producing a second triggering signal actuating means to discharge the condenser of the memory circuit on cessation of welding current flow in said welding cycle, and producing a third triggering signal immediately following the discharge of the condenser of the memory circuit actuating means to permit recharging of the condenser of the memory circuit by the output of the integrator means arising from the flow of welding current which has just ceased.

2. Electrical measuring apparatus as claimed in claim 1, wherein the triggering means is adapted so that the time interval between the second and third triggering signals is small, and the indicator device comprises a D.C. volt meter having such inertia that the time required for the volt meter to respond to discharge of the condenser of the memory circuit is large compared with said time interval, whereby whilst the welding current in successive welding cycles maintains a selected value the indication given in the voltmeter will remain substantially constant.

3. Electrical measuring apparatus as claimed in claim 1, wherein in order to obtain an immediate signal of the incidence of a timing fault, the integrator means is adapted to give an output which is determined by the total welding current in a welding cycle divided by a selected factor which represents the desired number of current cycles in the welding period and comprises adjustable means adapted on adjustment to vary said selected factor.

4. Electrical measuring apparatus as claimed in claim 1, wherein the triggering means is connected to be supplied with power from the main supply through the welding apparatus thereby to be supplied with power only during the passage of welding current.

5. Electrical measuring apparatus as claimed in claim 1 wherein the pick-up means of the input means is in the form of a split toroid, and the halves of the split toroid are connected to separate integrators to produce from inputs which are proportional to the rate of change of flux around the welder arm, two outputs proportional to the flux, and the apparatus comprises biphase rectifiers through which these outputs are fed to the integrator means.

6. Electrical measuring apparatus as claimed in claim 5, wherein the spilt toroid comprises an even number of coils disposed in a circle with their axes tangential to a circle with its centre on the axis of the toroid and with a radius equal to the mean radius of the toroid and the coils are connected in two circuits, alternate coils being in series in one circuit and the remaining coils being in series in the second circuit.

7. Electrical measuring apparatus for measuring the welding current in intermittently-operated alternating current welding apparatus giving successive current flows of equal time duration, said measuring apparatus comprising input means, which input means includes electromagnetically-operated pick-up means and produces a pulsating output determined by the instantaneous current flow in the welding circuit which includes the welding electrodes; integrator means connected to said input means to receive the pulsating output thereof, said integrator means including adjustable means for varying the time constant of the integrator means and producing at the end of said time duration an output determined by the total welding current flow in the said time duration and by said time constant of the integrator means; a gated amplifier; a memory circuit connected through the gated amplifier to receive the output of said integrator means, said memory circuit including a condenser connected to be charged by the integrator means; an indicator device connected to be operated by said memory circuit to give a reading determined by the instantaneous charge on the condenser; and triggering means adapted to be energized during welding current flow and including first triggering means which operates at commencement of a period of welding current flow and is connected to said integrator means to initiate its operation at said commencement of the period of welding current flow, second triggering means which operates at the end of said period of welding current flow and is connected to discharge said condenser of the memory circuit, and third triggering means connected to the second triggering means to be actuated at discharge of said condenser and connected to said gated amplifier to initiate its operation to permit re-charging of said condenser by said integrator means.

References Cited in the file of this patent
UNITED STATES PATENTS

| | | |
|---|---|---|
| 2,440,962 | Livingston | May 4, 1948 |
| 2,496,338 | Barton | Feb. 7, 1950 |
| 2,748,380 | Platte et al. | May 29, 1956 |

FOREIGN PATENTS

| | | |
|---|---|---|
| 697,879 | Great Britain | Sept. 30, 1953 |